US009933902B2

(12) United States Patent
Wu

(10) Patent No.: US 9,933,902 B2
(45) Date of Patent: Apr. 3, 2018

(54) TOUCH PANEL AND TOUCH SCREEN DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventor: Tianyi Wu, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 235 days.

(21) Appl. No.: 14/839,882

(22) Filed: Aug. 28, 2015

(65) Prior Publication Data
US 2016/0328055 A1 Nov. 10, 2016

(30) Foreign Application Priority Data

May 8, 2015 (CN) .......................... 2015 1 0232751

(51) Int. Cl.
*G06F 3/045* (2006.01)
*G06F 3/044* (2006.01)
(Continued)

(52) U.S. Cl.
CPC .............. *G06F 3/044* (2013.01); *G06F 3/046* (2013.01); *G06F 3/0412* (2013.01); *G09G 5/003* (2013.01);
(Continued)

(58) Field of Classification Search
CPC ........ G06F 3/044; G06F 3/0412; G06F 3/046; G06F 2203/04106; G09G 5/003; G09G 2300/0426
See application file for complete search history.

(56) References Cited

U.S. PATENT DOCUMENTS

2013/0155006 A1  6/2013  Li et al.
2014/0028616 A1* 1/2014  Furutani ................. G06F 3/044
                                                           345/174
(Continued)

FOREIGN PATENT DOCUMENTS

CN  103164089 A      6/2013
CN  103941939 A      7/2014
CN  204440346 U  *  7/2015  ............. G06F 3/041

OTHER PUBLICATIONS

Chinese Application No. 201510232751.0 First Office Action dated Apr. 20, 2017.

*Primary Examiner* — Claire X Pappas
*Assistant Examiner* — Gerald Oliver
(74) *Attorney, Agent, or Firm* — Alston & Bird LLP

(57) ABSTRACT

A touch panel and a touch screen display device are provided. The touch panel includes: a base plate including a display area and a border area; and a capacitive touch structure and an electromagnetic touch structure that are provided on a same side of the base plate; where the electromagnetic touch structure includes multiple first coils each extending in a first direction and multiple second coils each extending in a second direction; every two adjacent coils of the multiple first coils partly overlap each other; every two adjacent coils of the multiple second coils partly overlap each other; and the first direction is perpendicular to the second direction. The touch panel includes a capacitive touch structure for capacitive touch detection and an electromagnetic touch structure for electromagnetic touch detection, and thus may achieve both capacitive touch detection and electromagnetic touch detection.

11 Claims, 5 Drawing Sheets

(51) Int. Cl.
*G09G 5/00* (2006.01)
*G06F 3/041* (2006.01)
*G06F 3/046* (2006.01)

(52) U.S. Cl.
CPC .............. *G06F 2203/04106* (2013.01); *G09G 2300/0426* (2013.01)

(56) References Cited

U.S. PATENT DOCUMENTS

| | | | |
|---|---|---|---|
| 2014/0226086 A1* | 8/2014 | Chu | G06F 3/044 349/12 |
| 2014/0368756 A1* | 12/2014 | Lee | G06F 3/0412 349/12 |
| 2015/0022483 A1* | 1/2015 | Lai | G06F 3/044 345/174 |
| 2015/0130746 A1* | 5/2015 | Jung | B32B 37/025 345/174 |
| 2016/0041677 A1* | 2/2016 | Tahara | G06F 3/0416 345/174 |
| 2016/0291774 A1* | 10/2016 | Jin | G06F 3/0416 |

* cited by examiner

TOUCH PANEL AND TOUCH SCREEN DISPLAY DEVICE

CROSS REFERENCE OF RELATED APPLICATION

The present application claims the priority to Chinese Patent Application No. 201510232751.0, entitled "TOUCH PANEL AND TOUCH SCREEN DISPLAY DEVICE", filed on May 8, 2015 with the State Intellectual Property Office of the Peoples Republic of China, which is incorporated herein by reference in its entirety.

FIELD OF THE INVENTION

The present disclosure relates to the technical field of touch screen device, and in particular, to a touch panel and a touch screen display device.

BACKGROUND OF THE INVENTION

With the continuous development of technology, electronic devices with touch display function are increasingly applied in daily life and work of human beings, bringing great convenience to the daily life and work of human beings.

A main component of an electronic device with touch display function is a touch panel. Currently, conventional touch panels include touch panels having a capacitive touch structure and touch panels having an electromagnetic touch structure.

Thus, an existing electronic device with touch display function normally can only perform either a capacitive touch detection function or an electromagnetic touch detection function.

SUMMARY OF THE INVENTION

In view of the above, a touch panel and a touch screen display device are provided in the present disclosure, with which both capacitive touch detection and electromagnetic touch detection can be achieved.

Technical solutions provided in the present disclosure are described as follows.

A touch panel is provided, which includes:

a base plate including a display area and a border area; and a capacitive touch structure and an electromagnetic touch structure that are provided on a same side of the base plate; wherein the electromagnetic touch structure includes multiple first coils each extending in a first direction and multiple second coils each extending in a second direction;

every two adjacent coils of the first coils partly overlap each other;

every two adjacent coils of the second coils partly overlap each other; and the first direction is perpendicular to the second direction.

In the disclosure, there is also provided a touch screen display device, including:

a first substrate and a second substrate that are provided oppositely; and a liquid crystal layer provided between the first substrate and the second substrate; wherein the first substrate is the above-described touch panel.

According to the above description, the touch panel in the present disclosure is provided with a capacitive touch structure for capacitive touch detection and an electromagnetic touch structure for electromagnetic touch detection. Therefore, the touch screen display device having the touch panel may achieve both the capacitive touch detection and the electromagnetic touch detection.

BRIEF DESCRIPTION OF THE DRAWING(S)

Having thus described the invention in general terms, reference will now be made to the accompanying drawings, which are not necessarily drawn to scale, and wherein:

The accompanying drawings needed to be used in description of embodiments of the present disclosure are described briefly hereinafter, to clarify technical solutions according to the embodiments of the present disclosure. It is obvious that the accompanying drawings in the following description are only for some embodiments of the present disclosure. For those skilled in the art, other accompanying drawings may be obtained based on these accompanying drawings without any creative work.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The technical solutions according to the embodiments of the present disclosure are described clearly and completely as follows in conjunction with the accompanying drawings in the embodiments of the present disclosure. It is obvious that the described embodiments are only a part of the embodiments of the present application. All the other embodiments obtained by those skilled in the art based on the embodiments in the present disclosure without any creative work fall in the scope of the present disclosure.

In an embodiment of the present disclosure, there is provided a touch panel that may perform both capacitive touch detection and electromagnetic touch detection.

Figure 1:
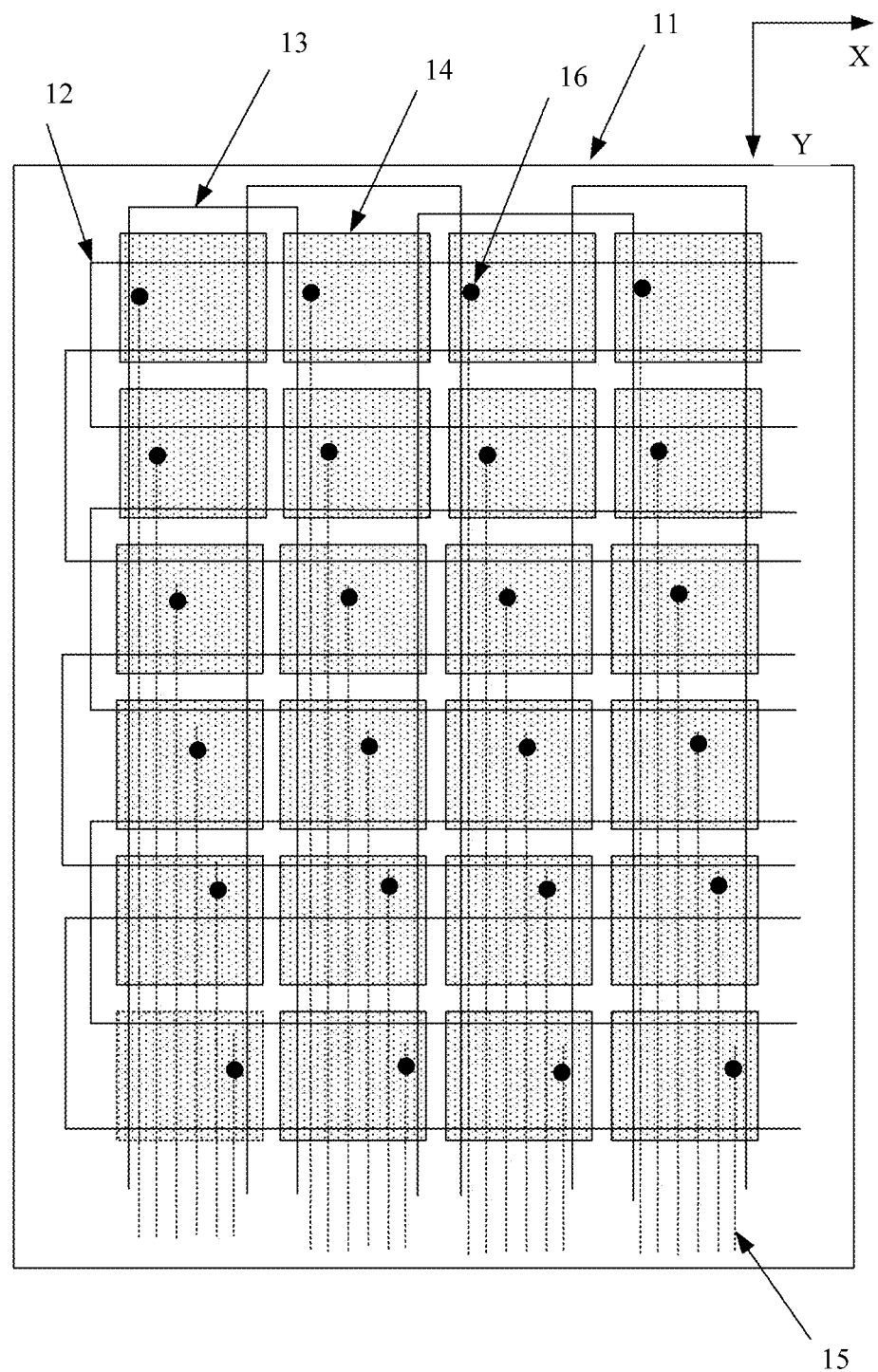
FIG. 1 is a schematic structural diagram of a touch panel according to an embodiment of the present disclosure.

FIG. 1 is a schematic structural diagram of a touch panel according to an embodiment of the present disclosure. As shown in FIG. 1, the touch panel includes a base plate 11 including a display area and a border area; and a capacitive touch structure and an electromagnetic touch structure that are provided on the same side of the base plate 11.

The electromagnetic touch structure includes multiple first coils 12 each extending in a first direction X and multiple second coils 13 each extending in a second direction Y. Every two adjacent coils of the first coils 12 partly overlap each other, and every two adjacent coils of the second coils 13 partly overlap each other. The first direction X is perpendicular to the second direction Y. Here, the item "overlaps" means their projections to the substrate have an overlapping area.

In the embodiment of the present disclosure, the capacitive touch structure includes a common electrode layer and a wiring layer. The common electrode layer and the wiring layer are provided correspondingly in a direction vertical to the base plate 11. Positions of the common electrode layer and the wiring layer may be configured depending on different manufacturing processes. The wiring layer may be provided either on a side of the common electrode layer or on an opposite side of the common electrode layer of the base plate 11. An insulating layer is provided between the common electrode layer and the wiring layer.

In the embodiment shown in FIG. 1, the capacitive touch structure is for self-capacitive touch detection. The common electrode layer includes multiple touch electrodes 14, which are arranged in array. The wiring layer includes multiple wires 15 each extending in the second direction Y. The wires 15 are connected to the touch electrodes 14 according to a one-to-one correspondence, and each of the wires 15 is correspondingly connected to one of the touch electrodes 14. And the wires 15 are connected to the touch electrodes 14 through corresponding via holes 16.

Figure 2:
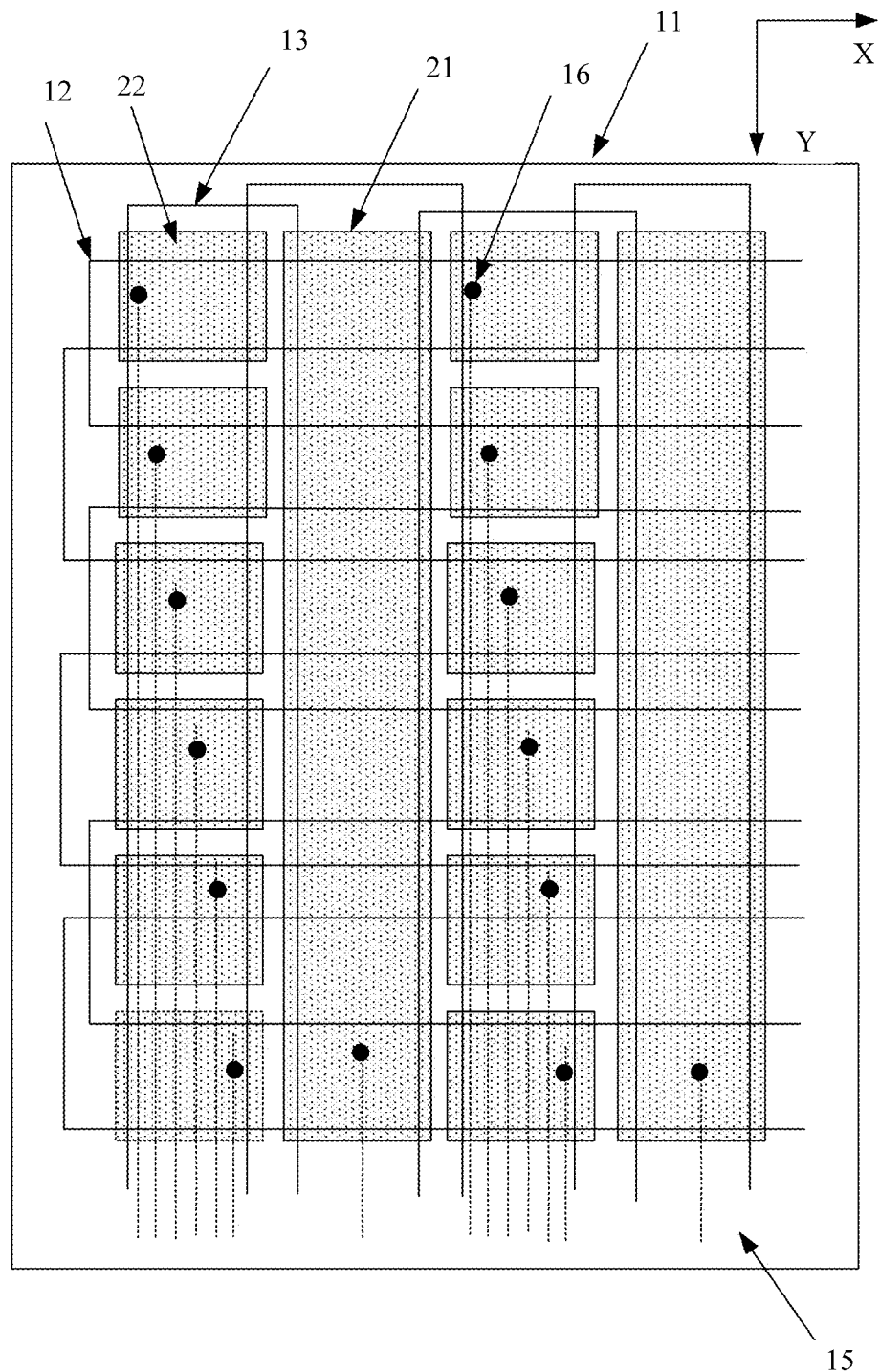
FIG. 2 is a schematic structural diagram of a touch panel according an embodiment of the present disclosure.

Alternatively, the structure of the touch panel may be configured as shown in FIG. 2, which is a schematic structural diagram of a touch panel according to another embodiment of the present disclosure. A capacitive touch structure of the touch panel is for mutual-capacitive touch detection. In this case, the common electrode layer includes multiple touch electrodes, and the multiple touch electrodes include multiple second electrodes 22 arranged in array and multiple first electrodes 21. Between every two adjacent columns of first electrodes 21, there is provided a second electrodes 22. Each of the second electrodes 22 corresponds to two columns of first electrodes 21. Thus, each of the first electrodes 21 and multiple corresponding second electrodes 22 form multiple mutual-capacitive sensing nodes which are used for mutual-capacitive touch detection.

One of the first electrodes 21 and the second electrodes 22 are touch sensing electrodes, and the other are touch driving electrodes. The same numeral references in FIG. 2 and FIG. 1 represent the same components.

In the embodiments of the present disclosure, the touch panel may be an array substrate or a color filter substrate.

In the case that the touch panel is a color filter substrate, the electromagnetic touch structure may be formed directly on the color filter substrate. However, this structure may result in large thickness of the color filter substrate and complicated manufacturing process, and thus results in large device thickness and high manufacture cost.

In the case that the touch panel is an array substrate, the array substrate is used in an IPS display mode and includes a common electrode layer and pixel electrodes. As described above, the common electrode layer includes multiple touch electrodes for forming the capacitive touch structure. In this case, the electromagnetic touch structure may be formed directly on a surface of the array substrate.

Similar to the method of forming the electromagnetic touch structure directly on the color filter substrate, the method of forming the electromagnetic touch structure directly on the surface of the array substrate may result in more manufacturing steps and complicated manufacturing process, and thus results in large device thickness and high manufacture cost.

In order to manufacture the touch panel without changing the manufacturing process of the color filter substrate or the array substrate and also without increasing the thickness, in the touch panel according to one embodiments of the present disclosure, the electromagnetic touch structure is integrated in the array substrate, and the first coils and the second coils and original structures of the array substrate are manufactured simultaneously. Therefore, the first coils and the second coils of the electromagnetic touch structure may be formed without causing any additional step in manufacturing the array substrate, the manufacturing process is simple, the cost is low and the thickness of the substrate is not increased.

Figure 3A:
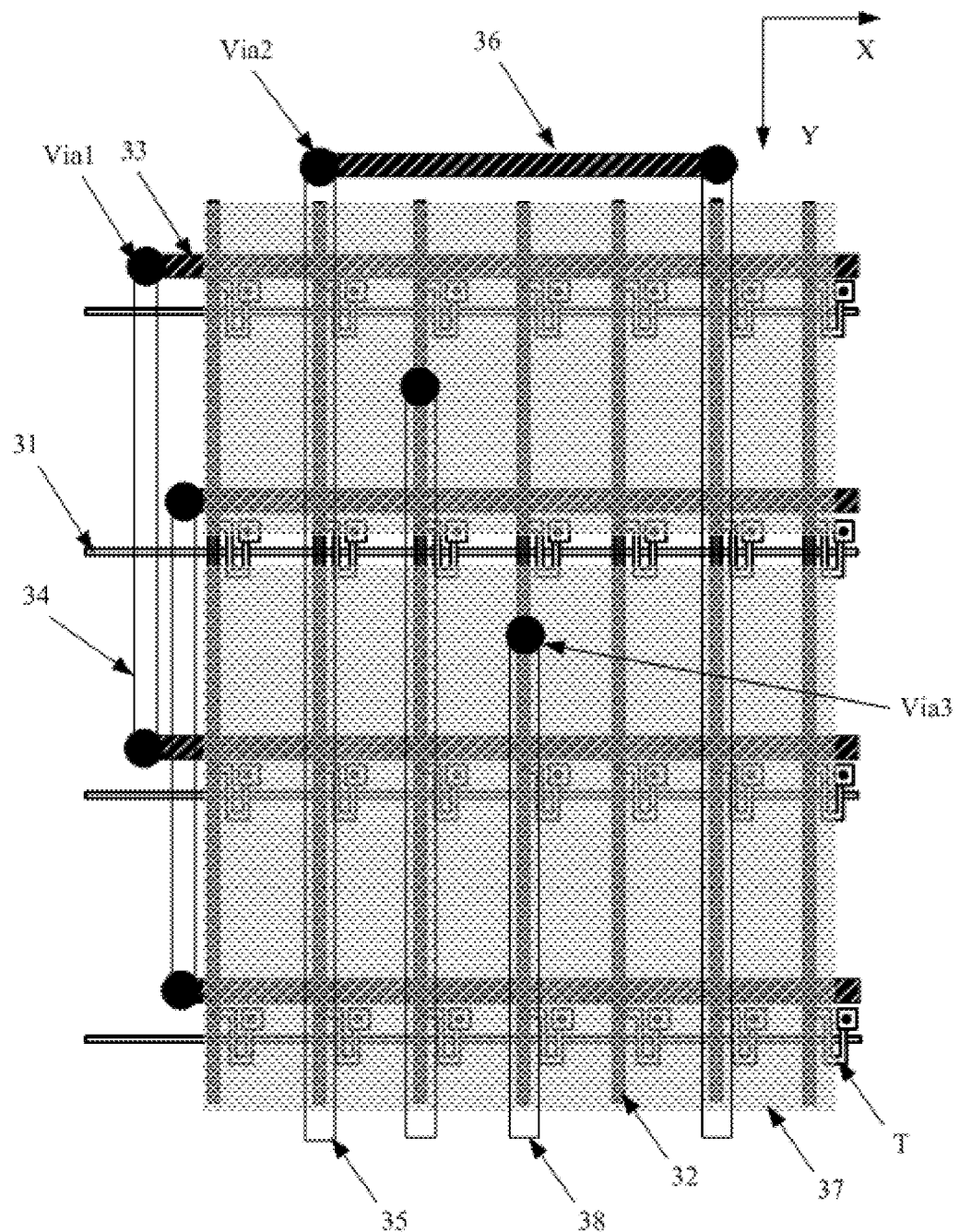
FIG. 3a is a schematic structural diagram of a touch panel according to an embodiment of the present disclosure.

In the case that the touch panel is based on an array substrate, the touch panel may have a structure as shown in FIG. 3a, which is a schematic structural diagram of a touch panel according an embodiment of the present disclosure. The shown touch panel is provided, in the display area, with multiple gate lines 31 arranged parallel to each other along the first direction X and multiple data lines 32 arranged parallel to each other along the second direction Y. The gate lines 31, each extending in the first direction X, are parallel to each other, and the data lines 32, each extending in the second direction Y, are parallel to each other.

The gate lines 31 are provided between the data lines 32 and the base plate and are directly provided on the surface of the display area. Thin-film transistors T are provided between the gate lines 31 and the data lines 32.

The border area is provided with a capacitive touch detecting circuit for capacitive touch scanning and an electromagnetic touch detecting circuit for electromagnetic touch scanning. The electromagnetic touch detecting circuit includes a first circuit connected to the first coils and a second circuit connected to the second coils. The capacitive touch detecting circuit and the electromagnetic touch detecting circuit are not shown in FIG. 3a.

In the embodiment shown in FIG. 3a, each of the first coils includes two first sides 33 extending in the first direction X and one second side 34 extending in the second direction Y. First ends of the two first sides 33 are connected to each other through the second side 34, and second ends of the two first sides 33 are both connected to the first circuit. Each of the second coils includes two third sides 35 extending in the second direction Y and one fourth side 36 extending in the first direction X. First ends of the two third sides 35 are connected to each other through the fourth side 36, and second ends of the two third sides 35 are both connected to the second circuit.

The first sides 33 and the fourth sides 36 are arranged in the same layer as the gate lines 31. The second sides 34 and the third sides 35 are arranged in the same layer as the wires 38. The first sides 33 and the second side 34 of each first coil are connected through first via holes Via1, and the third sides 35 and the fourth side 36 of each second coil are connected through second via holes Via2. Each of the wires 38 is connected to a corresponding touch electrode 37 through a third via hole Via3.

Since all of the first sides 33, the fourth sides 36 and the gate lines 31 extend in the first direction X, the first sides 33 and the fourth sides 36 may be arranged in the same layer as the gate lines 31. A metal layer used for forming the gate lines 31 may be used to form the first sides 33, the fourth sides 36 and the gate lines 31 simultaneously. Since all of the second sides 34, the third sides 35 and the wires 38 extend in the second direction Y, the second sides 34 and the third sides 35 may be arranged in the same layer as the wires 38. A metal layer used for forming the wires 38 may be used to form the second sides 34, the third sides 35 and the wires 38 simultaneously. With the above-mentioned arrangement, the first coils and the second coils of the electromagnetic touch structure can be formed without causing extra manufacture step and increased manufacture cost. When compared with the method of forming the electromagnetic touch structure directly on the surface of the array substrate, the above-mentioned arrangement leads to a simpler process and a lower cost, and the thickness of the touch panel is relative thin.

Alternatively, the second sides 34 and the third sides 35 may be arranged in the same layer as the data lines 32 since all of the data lines 32, the second sides 34 and the third sides 35 extend in the second direction Y. Similarly, the first sides 33 and the second side 34 of each first coil are connected through first via holes, and the third sides 35 and the fourth side 36 of each second coil are connected through second via holes. In this case, the number of functional layers penetrated by the first via hole and the number of functional layers penetrated by the second via hole are different from those in the embodiment shown in FIG. 3a.

The embodiment shown in FIG. 3a is an embodiment of the present disclosure. By arranging the second sides 34 and the third sides 35 in the same layer as the wires 38, the touch panel is ensured with high aperture opening ratio and good light transmittance.

The projections of the second sides 34 and the projections of the fourth sides to the base plate in a direction vertical to the base plate are all within the border area. Hence, metal wires within the display area are reduced, ensuring good light transmittance.

As shown in FIG. 3a, multiple pixel unit regions are defined by intersections of the gate lines and data lines which are insulated from each other, and each of the pixel unit regions is provided with one pixel electrode. The pixel electrodes are connected to the thin-film transistors T according to a one-to-one correspondence. The pixel electrodes are not shown in FIG. 3a.

The pixel electrodes may be arranged in the same layer as the wires 38, the touch electrodes 37 are located between the pixel electrodes and the base plate, and an insulating layer is provided between the touch electrodes 37 and the wires 38.

Alternatively, the wires 38 may be arranged between the touch electrodes 37 and the base plate, and the touch electrodes 37 are located between the wires 38 and the pixel electrodes, and insulating layers are respectively provided between the wires 38 and the touch electrodes 37 and between the pixel electrodes and the touch electrodes 37.

Alternatively, the pixel electrodes may be arranged in the same layer as the wires 38, the wires 38 are located between the touch electrodes 37 and the base plate, and an insulating layer is provided between the touch electrodes 37 and the wires 38.

Optionally, the wires 38 are arranged between the touch electrodes 37 and the base plate, and the touch electrodes 37 are arranged between the wires 38 and the pixel electrodes. In this case, all of the first sides 33, the second sides 34, the third sides 35 and the fourth sides 36 are located on a side of the touch electrodes 37 opposite to the pixel electrodes. During an electromagnetic touch detection, the touch electrodes 37 can shield detecting signals in the first coils and the second coils from the pixel electrodes; hence, the detecting signals are prevented from interfering with display signals in the pixel electrodes, ensuring a good display effect.

FIG. 3a shows a top view corresponding to only two touch electrodes 37, where the touch electrodes may be included in a self-capacitive touch detecting structure or in a mutual-capacitive touch detecting structure. Optionally, in the embodiment shown in FIG. 3a, the first sides 33 and the fourth sides 36 are arranged in the same layer as the gate lines 31.

Figure 3B:
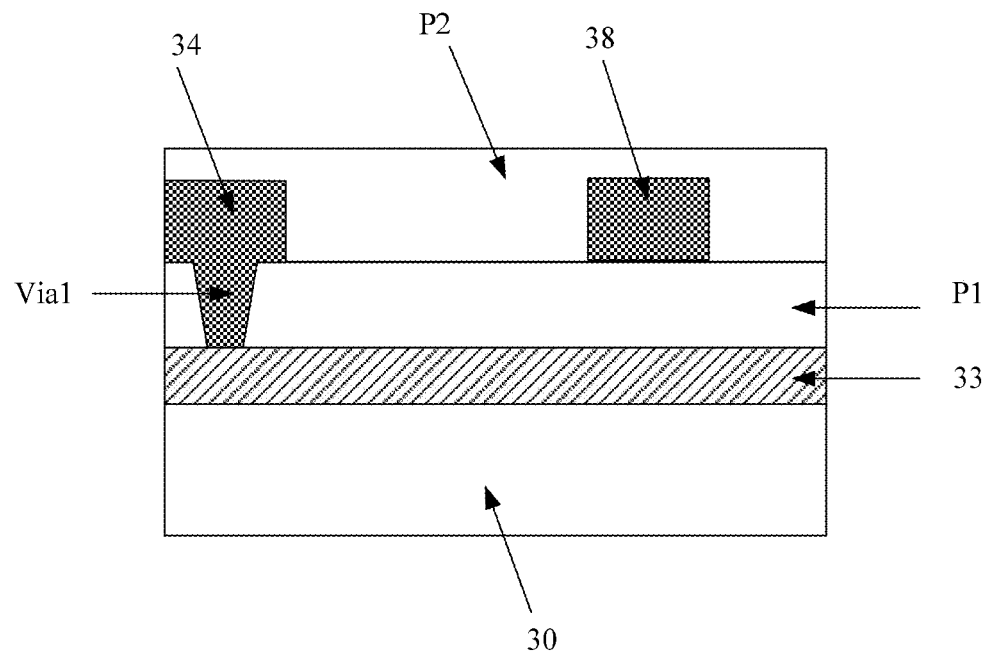
FIG. 3b is a sectional view of the touch panel in FIG. 3a, taken along a first side.

FIG. 3b is a sectional view of the touch panel in FIG. 3a, which is taken along the first side 33. The first side 33 is provided on the surface of the base plate 30 and is arranged in the same layer as the gate lines. The second side 34 is arranged in the same layer as the wire 38. A first insulating layer P1 is provided between the first side 33 and the second side 34. A second insulating layer P2 covers surfaces of the second side 34 and the data lines 32. The first via hole Via1 penetrates the first insulating layer P1. The second side 34 is connected to the first side 33 through the first via hole Via1.

Figure 3C:
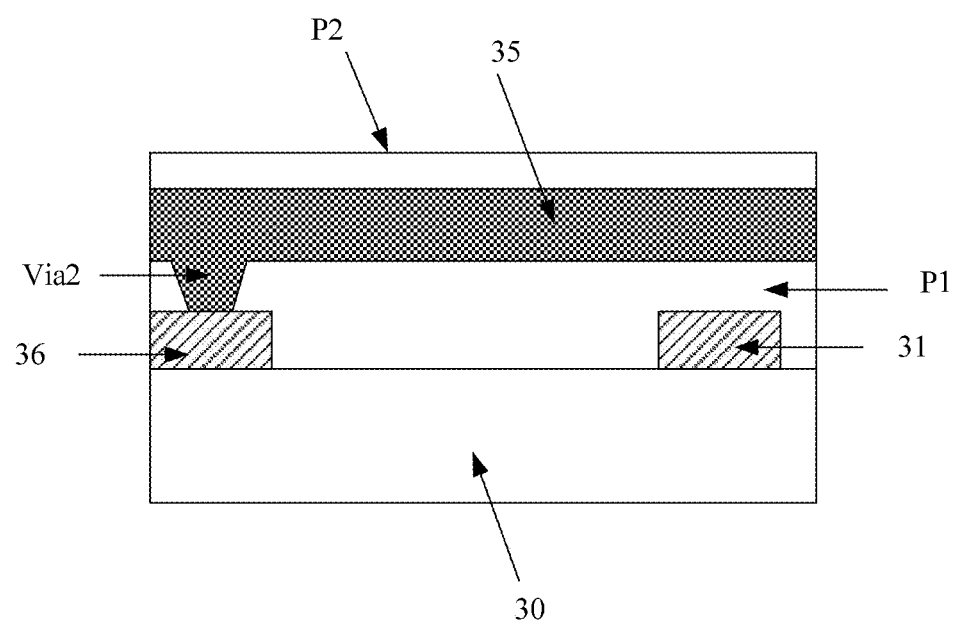
FIG. 3c is a sectional view of the touch panel in FIG. 3a, taken along a third side.

FIG. 3c is a sectional view of the touch panel in FIG. 3a, which is taken along the third side 35. The fourth side 36 is provided on the surface of the base plate 30 and is arranged in the same layer as the gate line 31. The third side 35 is arranged in the same layer as the wires. The first insulating layer P1 is provided between the third side 35 and the fourth side 36. The second insulating layer P2 covers the surface of the third side 35. The second via hole Via2 penetrates the first insulating layer P1. The third side 35 is connected to the fourth side 36 through the second via hole Via2.

It should be noted that, components such as the pixel electrodes and the common electrodes layer are not shown in FIG. 3b and FIG. 3c. The first insulating layer P1 may be provided as a multi-layer structure as required.

According to the above description, the touch panel in the embodiments of the present disclosure can achieve both capacitive touch detection and electromagnetic touch detection. In addition, the electromagnetic touch structure may be integrated into the array substrate without changing the manufacturing process of the array substrate, the manufacturing process is simple, the cost is low, and the thickness of the substrate is not increased.

Figure 4:
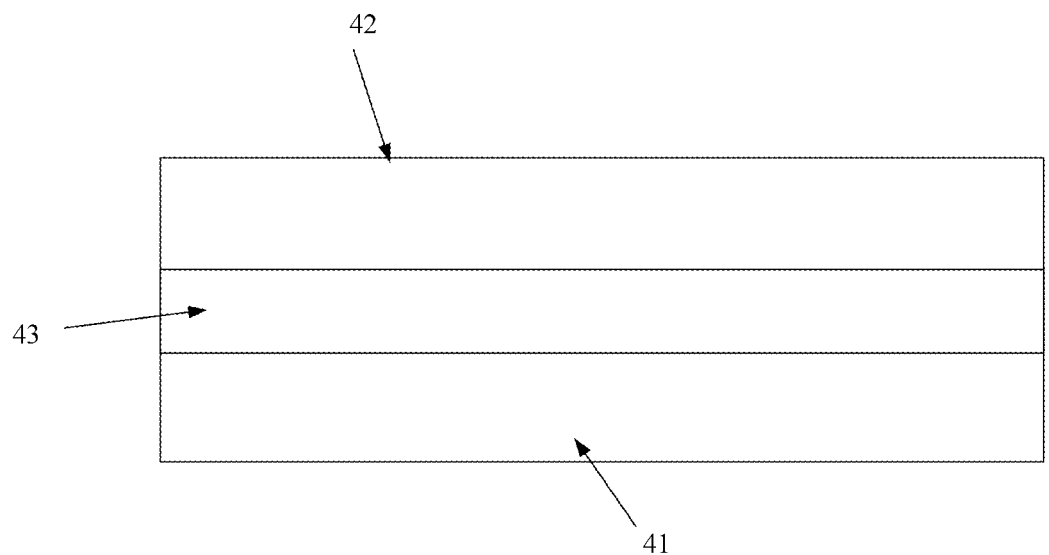
FIG. 4 is a schematic structural diagram of a touch screen display device according to an embodiment of the present disclosure.

According to an embodiment of the present disclosure, there is also provided a touch screen display device. FIG. 4 is a schematic structural diagram of a touch screen display device according to an embodiment of the present disclosure. The touch screen display device includes a first substrate 41 and a second substrate 42 that are provided oppositely, and a liquid crystal layer 43 provided between the first substrate 41 and the second substrate 42. The first substrate is the touch panel according to any of the above embodiments.

With the touch panel according to any of the above embodiments, the touch screen display device according to the embodiment can achieve both capacitive touch detection and electromagnetic touch detection. In addition, the array substrate may be integrated with the electromagnetic touch structure; hence, the thickness of the touch screen display device is not increased and the manufacture cost is not increased.

The above description of the embodiments disclosed herein enables those skilled in the art to implement or use the present innovation. Numerous modifications to the embodiments are apparent to those skilled in the art, and the general principle herein can be implemented in other embodiments without deviation from the spirit or scope of the embodiments of the present disclosure. Therefore, the present disclosure is not limited to the embodiments described herein, but should be in accordance with the widest scope consistent with the principle and novel features disclosed herein.

That which is claimed:

1. A touch panel, comprising:
a base plate, the base plate comprising a display area and a border area, wherein the border area is provided with an electromagnetic touch detecting circuit for electromagnetic touch scanning, and the electromagnetic touch detecting circuit comprises a first circuit and a second circuit; and
a capacitive touch structure and an electromagnetic touch structure that are provided on a same side of the base plate;
wherein the electromagnetic touch structure comprises a plurality of first coils each extending in a first direction and a plurality of second coils each extending in a second direction, wherein the first direction is perpendicular to the second direction;
wherein the first coils are arranged in adjacent pairs that partly overlap each other;
wherein the second coils are arranged in adjacent pairs that partly overlap each other;
wherein each of the first coils comprises two first sides each extending in the first direction and one second side extending in the second direction, first ends of the two first sides are connected to each other through the second side, and second ends of the two first sides are connected to the first circuit; and
wherein each of the second coils comprises two third sides each extending in the second direction and one fourth side extending in the first direction, first ends of the two third sides are connected to each other through the fourth side, and second ends of the two third sides are connected to the second circuit.

2. The touch panel according to claim 1, wherein the capacitive touch structure comprises:
a common electrode layer and a wiring layer; wherein
the common electrode layer comprises a plurality of touch electrodes;
the wiring layer comprises a plurality of wires each extending in the second direction; and
the plurality of wires are connected to the plurality of touch electrodes according to a one-to-one correspondence.

3. The touch panel according to claim 2, wherein
the display area is provided with a plurality of gate lines that are parallel to each other and a plurality of data lines that are parallel to each other, wherein each of the plurality of gate lines extends in the first direction and each of the plurality of data lines extends in the second direction; and
the border area is provided with a capacitive touch detecting circuit for capacitive touch scanning.

4. The touch panel according to claim 3, wherein the first sides and the fourth sides are provided in a same layer as the plurality of gate lines.

5. The touch panel according to claim 4, wherein
the second sides and the third sides are provided in a same layer as the wires;
the first sides and the second side of each of the first coils are connected through first via holes; and
the third sides and the fourth side of each of the second coils are connected through second via holes.

6. The touch panel according to claim 3, wherein a plurality of pixel unit regions are defined by intersections of the gate lines and data lines which are insulated from each other, and each of the plurality of pixel unit regions is provided with one pixel electrode.

7. The touch panel according to claim 6, wherein
the pixel electrodes are arranged in a same layer as the wires; and
the touch electrodes are provided between the pixel electrodes and the base plate.

8. The touch panel according to claim 6, wherein
the wires are provided between the touch electrodes and the base plate; and
the touch electrodes are provided between the wires and the pixel electrodes.

9. The touch panel according to claim 6, wherein
the pixel electrodes are arranged in a same layer as the wires; and
the wires are provided between the touch electrodes and the base plate.

10. The touch panel according to claim 1, wherein projections of the second sides and projections of the fourth sides onto the base plate in a direction vertical to the base plate are within the border area.

11. A touch screen display device, comprising:
a first substrate and a second substrate that are provided oppositely; and
a liquid crystal layer provided between the first substrate and the second substrate; wherein
the first substrate comprises:
a base plate, the base plate comprising a display area and a border area, wherein the border area is provided with an electromagnetic touch detecting circuit for electromagnetic touch scanning, and the electromagnetic touch detecting circuit comprises a first circuit and a second circuit; and
a capacitive touch structure and an electromagnetic touch structure that are provided on a same side of the base plate;
wherein the electromagnetic touch structure comprises a plurality of first coils each extending in a first direction and a plurality of second coils each extending in a second direction, wherein the first direction is perpendicular to the second direction;
wherein the first coils are arranged in adjacent pairs that partly overlap each other;
wherein the second coils are arranged in adjacent pairs that partly overlap each other;
wherein each of the first coils comprises two first sides each extending in the first direction and one second side extending in the second direction, first ends of the two first sides are connected to each other through the second side, and second ends of the two first sides are connected to the first circuit; and
wherein each of the second coils comprises two third sides each extending in the second direction and one fourth side extending in the first direction, first ends of the two third sides are connected to each other through the fourth side, and second ends of the two third sides are connected to the second circuit.

\* \* \* \* \*